United States Patent

[11] 3,603,279

[72] Inventor John P. Hooks
    13701 South Kildare Ave., Crestwood, Ill. 60445
[21] Appl. No. 41,823
[22] Filed June 1, 1970
[45] Patented Sept. 7, 1971

[54] TRAILER TROLLEY INDICATOR
    6 Claims, 4 Drawing Figs.
[52] U.S. Cl. .................................................. 116/28, 200/61.44, 340/61
[51] Int. Cl. .................................................. B60q
[50] Field of Search .......................................... 116/28, 114, 135, 124; 200/61.44; 340/61

[56] References Cited
    UNITED STATES PATENTS
    2,554,371  5/1951  Marx ........................... 200/61.44
    2,834,002  5/1958  Nordsiek ....................... 340/61
    2,894,087  7/1959  Kramer ......................... 200/61.44
    3,137,267  6/1964  Hurt ............................ 116/28
    3,232,265  2/1966  Hurt ............................ 116/28

Primary Examiner—Louis J. Capozi
Attorney—Molinare, Allegretti, Newitt & Witcoff ABSTRACT: A clearance indicator for a vehicle constructed and arranged so as to indicate the clearance between the top of the vehicle and an obstruction. The clearance indicator includes a trolley rod pivoted on the vehicle and having a cam portion extending above the vehicle and positioned so as to engage the obstruction, a pushrod and flexible cable assembly operatively connected to the trolley rod and to an indicator for moving the indicator longitudinally so as to indicate the amount of clearance between the vehicle and the obstruction in response to movement of the trolley rod.

PATENTED SEP 7 1971 3,603,279
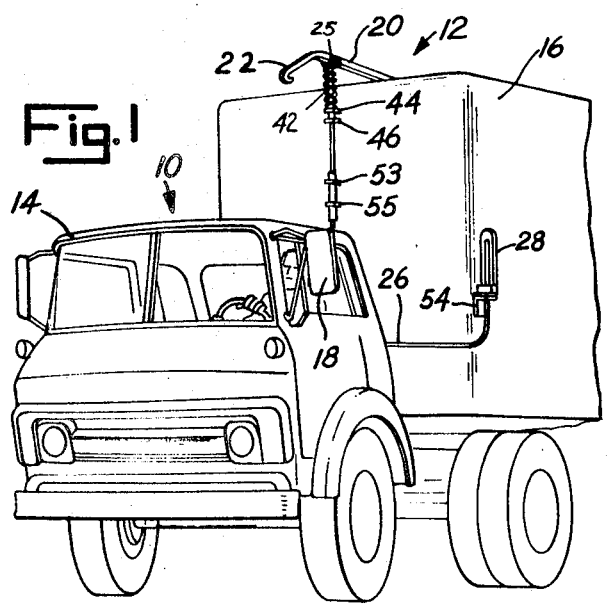
Fig.1
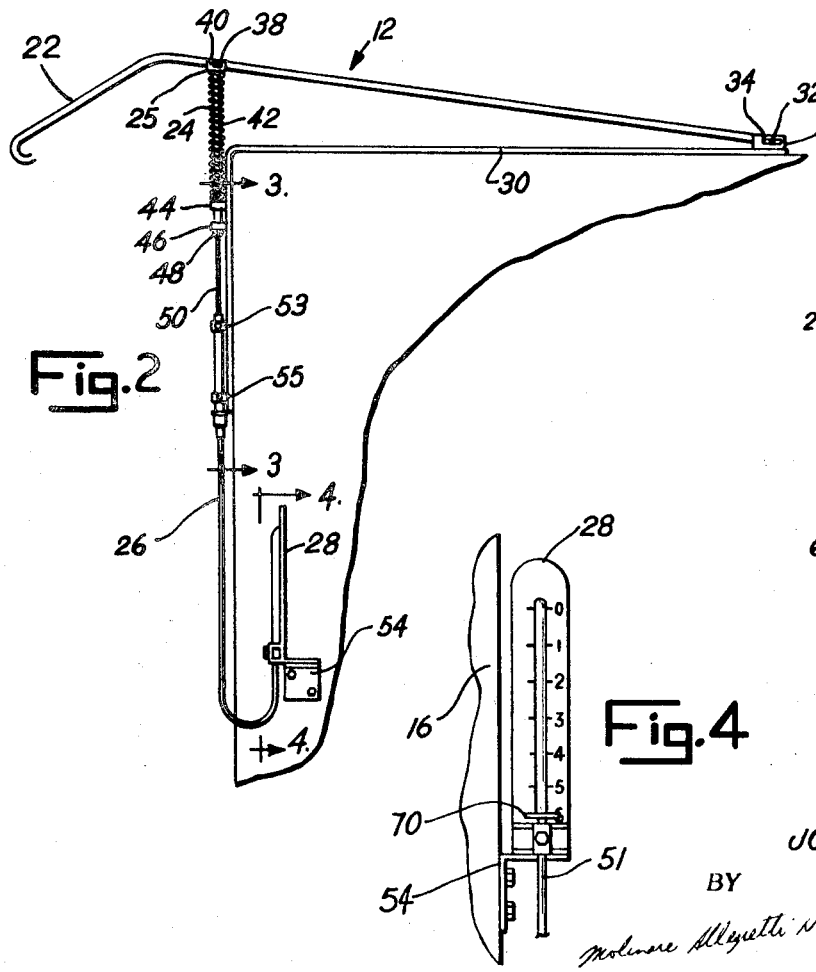
Fig.2
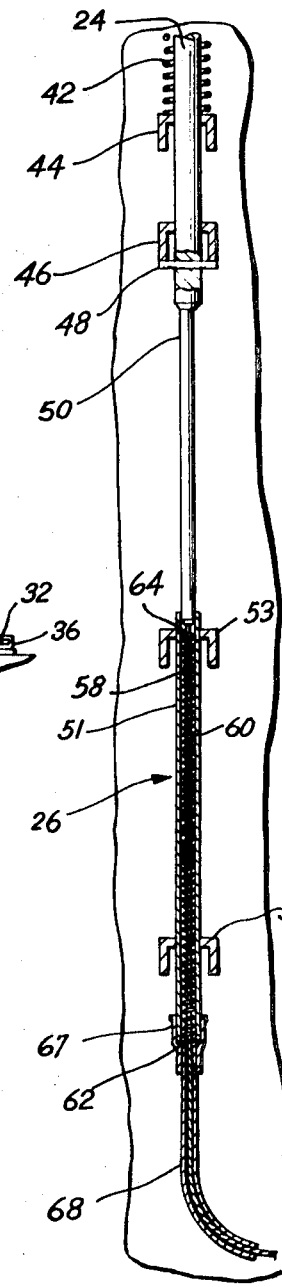
Fig.3
Fig.4
INVENTOR.
JOHN P. HOOKS
BY
Molinare Allegretti Newitt & Witcoff
ATTORNEYS 3,603,279

TRAILER TROLLEY INDICATOR

BACKGROUND OF THE INVENTION

This invention relates to a clearance indicator for vehicles and more particularly, to an improved clearance indicator adopted to be mounted on the trailer of a trailer truck.

It is known in the prior art to provide an electric clearance detector switch on a motor truck to give a signal to the operator of the truck when an obstruction is encountered. An example of this type of construction is illustrated in Marx U.S. Pat. No. 2,554,371. This device produces a go-no go signal, but fails to give the vehicle driver any indication of the amount of clearance, which can vary, for example, depending upon whether the trailer is loaded or unloaded.

Also, in Hurt 3,137,267 there is shown a clearance indicator mounted on the cab of a trailer truck. The Hurt device includes a feeler secured to the rotatable shaft of an indicator by a flexible cable that is wound on the rotatable shaft. The flexible cable can wind differently upon the rotatable shaft and thereby can alter the reading on the indicator which bears indicia correlated with vehicle speed. The clearance indicator of Hurt is constructed and arranged such that if the vehicle were backed into engagement with an obstruction, the feeler and/or the indicator would be damaged.

An object of the present invention is to provide an improved direct-acting mechanical clearance indicator adapted to be mounted on the trailer of a tractor-trailer vehicle.

A further object of this invention is to provide an improved clearance indicator for a vehicle, such clearance indicator including a trolley rod constructed and arranged to yield upon engagement with an obstruction, whether or not the vehicle is moving forward or in reverse, said trolley rod being directly connected to a longitudinally-actuated indicator by flexible cable means, for example, a Bowden wire. Other objects and advantages of this invention will be made more apparent hereafter.

BRIEF DESCRIPTION OF THE DRAWING

There is shown in the attached drawing a preferred embodiment of the present invention wherein:

FIG. 1 is a perspective view of a vehicle, namely, a trailer truck, having the clearance indicator of the present invention mounted thereon in position on the trailer;

FIG. 2 is a fragmentary side view of the trailer of FIG. 1 illustrating the clearance indicator in position;

FIG. 3 is an elevational view, partly in section, illustrating a portion of the clearance indicator; and FIG. 4 is a detail view illustrating the indicator gauge mounted on the side of the trailer where it can be readily observed from the truck cab the the truck operator.

DETAILED DESCRIPTION OF THE PRESENT INVENTION

Referring to FIG. 1, there is illustrated a vehicle 10 having mounted thereon the clearance indicator 12 of the present invention. The vehicle 10 as shown comprises a truck cab 14 operatively connected to a trailer 16 in the usual fashion.

Mounted on the trailer 16 in position to be viewed by the driver of the cab 14 through the mirror 18 is the clearance indicator 12 of this invention. Essentially, the clearance indicator 12 comprises a trolley rod 20 adapted to be pivoted at one end and having a cam portion 22 defined at the end opposite the pivot end. The trolley rod 20 is constructed and arranged so as to yield upon engagement with an obstruction whether or not the vehicle is moving forward or in reverse. Intermediate the ends of the trolley rod 20 there is connected a pushrod 24. The end of the pushrod 24 remote from the trolley rod is secured to a flexible cable or Bowden cable 26 that is disposed between the push rod and the indicator gauge 28 for actuating the indicator directly in a longitudinal direction to indicate the clearance between the top of the trolley rod and an obstruction.

Turning now to FIGS. 2 and 3, there is better illustrated the construction of the clearance indicator.

The clearance indicator 12 is adapted to be secured to a trailer in a suitable fashion, either by being fastened directly to the trailer, or alternatively by being joined to a bracket means 30 that is in turn suitably affixed to the vehicle. The rear end of the trolley rod 20 carries a pivot pin 32 which is adapted to be engaged within a slot 34 in an upwardly opening U-shaped bracket member 36 suitably affixed to the bracket 30. The pushrod 24 is secured to the trolley rod 20 intermediate the ends thereof by means of a pivoted connection which comprises a swivel pin 38 extending from opposite sides of the trolley rod into slotted openings 40 in the yoke portion 25 at the top of the pushrod 24. The pivotal connections of the trolley rod 24 both at the end of the rod and intermediate the ends will permit some flexibility in alignment of the trolley rod and will also accommodate some shock in the event the trolley rod 20 should strike an obstruction during operation of the vehicle 10.

The trolley rod 20 is adapted to be biased to its uppermost position by means of a spring 42 concentrically disposed about the pushrod 24 and mounted between the yoke 25 at the top of the pushrod 24 and the bracket guide portion 44 within which the pushrod 24 slides. The bracket guide portions 44 and 46 cooperate with the upper portion of the pushrod 24 so as to guide same in a path along the longitudinal axis of the pushrod. A pin stop 48 extends from the pushrod 24 and is adapted to engage the underside of the bracket guide portion 46 so as to limit upward movement or the upward stroke of the pushrod 24 in operation.

The pushrod 24 includes an upper portion of larger diameter and a lower portion 50 of smaller diameter. The lower portion 50 is suitably connected to a flexible cable which is a part of the flexible cable means 26 for directly actuating the indicator stop on the indicator gauge 28. The indicator gauge 28 is affixed to the side of the vehicle by a suitable bracket 54 such that the indicator stop or marker can be readily observed by the vehicle operator in the mirror 18 on the vehicle cab 14.

In FIG. 3, there is better shown the flexible cable means 26 and the manner of connecting the flexible cable means 26 and the pushrod 24 so as to provide for direct actuation of the indicator stop on the indicator gauge 28.

The flexible cable means 26 is sheathed by housing means including a housing 51 that is adapted to be secured to the brackets 53 and 55, which are in turn secured to the vehicle trailer 16. The connection means for affixing the housing 51 within brackets 51 and 55 may comprise a set screw or like fastening means. Movably mounted within the housing 51 is a flexible cable or flexible shaft 58, for example, a Bowden cable, which is slidable within the housing 51 and is connected at one end to the reduced diameter portion 50 of the pushrod 24 and at the other end to the indicator stop on the indicator gauge 28. Disposed about the flexible cable 58 within housing 51 is a spring 60 which is operative between a shoulder 62 in the housing 51 and a collar 64 affixed to the flexible cable or shaft 58 for urging the flexible shaft 58 and the pushrod 24 secured thereto in an upward direction so as to return the trolley rod 20 to its uppermost position. The housing means for cable 58 includes not only the portion 51 disposed between the upper end of the flexible rod between the brackets 53 and 55 but also a second portion 68 secured to the first portion 51 by means of a coupler 67.

In FIG. 4, there is illustrated one form of indicator gauge 28 of the present invention. Secured to the flexible cable 51 at the indicator end is a stop or marker 70 which is adapted to be moved longitudinally within the gauge 28. Suitable indicia as, for example, numbers indicating inches, are formed on the face of the indicator gauge. In the illustrated embodiment the gauge is marked in the scale from 0–6. In initial adjustment of the clearance indicator 12, the trolley rod and flexible cable will be adjusted such that movement of the gauge 70 will reflect inches of clearance from 6 inches to 0 inches. It will be apparent that the indicia on the indicator 28 may be modified with appropriate modification of the stroke of the trolley rod without deviating from the concepts of the present invention.

There has been provided by the present invention a unique combination of elements defining a clearance indicator that is simple in construction and thus, readily manufactured. The clearance indicator can readily be mounted on a trailer of a truck trailer vehicle. In use, the trolley rod of the clearance indicator is mounted so that it can easily withstand shock and is capable of accommodating movement of the vehicle either in a forward direction or a rearward direction without causing any damage thereto. This feature results from the loosely pivoted connections of the trolley rod to the vehicle and to the pushrod.

Another feature of the present invention is the direct connection of the trolley rod to the indicator gauge by means of a flexible yet rigid cable or wire which produces a longitudinal movement of the indicator by direct mechanical connection.

While we have described a presently preferred embodiment of my invention, it will be understood that the invention is not limited thereto, and it can be embodied within the scope of the following claims:

1. A clearance indicator for a vehicle to indicate clearance between the top of the vehicle and an obstruction comprising, in combination, bracket means adapted to be mounted on the vehicle, a trolley rod pivoted on the vehicle and having a cam portion extending above the vehicle and positioned to engage said obstruction, a pushrod slidable in said bracket means and operatively affixed to said trolley rod, an indicator gauge positioned for view of the vehicle operator for indicating the amount of clearance between the vehicle and obstruction, and a flexible cable directly connected between the pushrod and the indicator gauge and responsive to movement of the trolley rod for actuating the indicator.

2. A clearance indicator as in claim 1 including first spring means for biasing the trolley rod to a first extended position away from the vehicle.

3. A clearance indicator as in claim 2 including second spring means cooperating with said pushrod for biasing the pushrod so as to urge the trolley rod to said first extended position.

4. A clearance indicator as in claim 1 wherein said trolley rod comprises an elongated rod pivoted at one end to the vehicle and having the pushrod pivotally connected thereto intermediate its ends, the end of the trolley rod remote from the pivoted end being crooked to define a cam portion which is operable without damage thereto whether the vehicle engages the obstruction, whether moving forwardly or in reverse.

5. A clearance indicator as in claim 4 wherein the trolley rod has a pin carried on an end for engagement in a slotted opening in said bracket means to provide a slidable pivoted connection between the end of the trolley rod and the bracket means.

6. A trolley clearance indicator as in claim 1 wherein the trolley rod comprises an elongated rod slidably and pivotally connected at one end to the vehicle, the pushrod being slidably pivotally connected to the trolley rod.